United States Patent Office 3,446,838
Patented May 27, 1969

3,446,838
NOVEL ACIDS AND ESTERS DERIVED FROM HALOGENATED PHENOLS
Laszlo Szobel, Grenoble, Maurice Troussier, Pierre-Benite, and Jacques Vuillemenot, La Mulatiere, France, assignors to Ugine Kuhlmann, Paris, France, a corporation of France
No Drawing. Continuation-in-part of application Ser. No. 256,532, Feb. 6, 1963. This application Sept. 20, 1965, Ser. No. 488,812
Claims priority, application France, Feb. 10, 1962, 887,628
Int. Cl. C07c 69/66
U.S. Cl. 260—473                        1 Claim

ABSTRACT OF THE DISCLOSURE

Acids and esters having a general formula

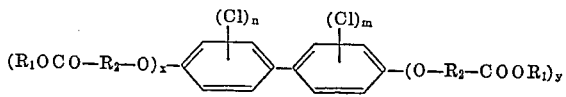

in which $R_1$ is either a hydrogen atom or an alkyl radical of 1 to 4 carbon atoms and $R_2$ is alkylene of from 1 to 3 carbon atoms, and where $(x+y)$ is an integer from 1 (wherein either $x$ or $y$ is zero) to 2, $(m+n)$ is the integer 8 or 9, and $(x+y+m+n)$ is equal to 10; said acids and esters being generally used in producing polyester resins, hardening agents for epoxy resins, etc.

---

The application is a continuation-in-part of our application Ser. No. 256,532 filed Feb. 6, 1963, and relating to Polyacids and Polyesters Derived From Halogenated Polyphenols and Process for Preparation of Same, now abandoned.

This invention relates to novel acids and esters derived from halogenated phenols having the general formula:

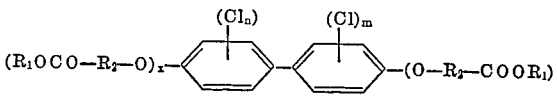

in which $R_1$ is a member selected from the group consisting of an atom of hydrogen and an alkyl radical containing from 1 to 4 atoms of carbon, $R_2$ is alkylene of 1 to 3 atoms of carbon, the amount $(x+y)$ is an integer number having values from 1 and in this case either $x$ or $y$ is 0 to 2, the amount $(m+n)$ is an integer number having the value of 9 or 8 and the amount $(x+y+m+n)$ always has the value 10.

They may be obtained by reacting an acid and/or a halogenated ester with an alkaline salt of the di- or monohydroxyperchlorodiphenyl. The dihydroxyperchlorodiphenyl may be prepared by reacting sodium hydroxide with decachlorodiphenyl in the presence of a solvent such as methanol, in an autoclave at 135–150° C. However, we prefer to use a process which comprises hydrolyzing powdered decachlorodiphenyl with an aqueous solution containing 6 to 10% sodium hydroxide, in the absence of organic solvents, above 200° C. and preferably between 240 and 250° C., under autogenous pressure. It is preferable to use from 4.2 to 5 mols of sodium hydroxide per mol of decachlorodiphenyl. After the reaction, a resulting solution of sodium phenate is filtrated, then acidified with a mineral acid, for example hydrochloric acid. The octachlorodihydroxydiphenyl separates in the form of a flocculent precipitate which is drained, washed and dried.

For preparing monohydroxyperchlorodiphenyl we react sodium hydroxide with decachlorodiphenyl in alcoholic solution, for example in tert-butyl alcohol, between 130 and 200° C., in an autoclave during 8 to 1 hours. A mixture of mono- and dihydroxyperchlorodiphenyl is obtained and we separate them from each other due to the difference of solubility in water of their alkaline salts, at suitable temperatures. Thus, we crystallize monophenate in water maintained between 0 and 5° C., whereas diphenate remains in solution. The isolated monophenate is dissolved in water, then the aqueous solution is acidified by a mineral acid such as hydrochloric acid. Next, the monohydroxyperchlorodiphenyl precipitates and then it is drained, washed and dried.

Examples of the halogenated acids which we employ are monochloro- and/or monobromoacetic acid and beta-bromopropionic acid. Examples of the halogenated esters we use are the methyl and/or ethyl esters of monochloroacetic acid.

The most interesting industrial application of these acids and/or esters is the production of polyester resins having a high halogen content and by virtue of this fact possessing excellent flame-resisting properties. The acids and/or esters of a functionality equal to 2 will lead to thermoplastic resins, whereas those whereof the functionality is higher than 2 can be used for the preparation of thermosetting compositions.

The acids and/or esters of the invention may in all cases be employed either alone or in combination with other organic polycarboxylic acids or their anhydrides, such as the o-, m- and p-phthalic acids, maleic anhydride and other esters such as the methyl esters of the o-, m- and p-phthalic acids.

Other interesting industrial applications of the acids of the present invention are as a hardening agent for epoxy resins, and in the preparation of their alkaline earth salts and of their cadmium or lead salts which have utility in stabilizing vinyl polychlorides.

The following non-limiting examples illustrate the invention:

EXAMPLE 1

Preparation of (biphenylene octachlorodioxy) diacetic acid 924 g. of octachlorodihydroxydiphenyl or 2 mols, thereof, 571.2 g. of potash in lozenges or 10.2 mols, thereof, and 2,700 cc. of ethanol were introduced in this order into a 5-liter reactor equipped with a mechanical stirrer, a condenser, a dropping funnel and a nitrogen supply point.

Agitation was performed under nitrogen at normal temperature until a homogeneous mass was obtained.

This homogeneous mass was then cooled to close to 0° C., and 567 g. of monochloroacetic acid or 6 mols, thereof, in solution in 600 cc. of ethanol was added in the course of 2 hours under agitation and under nitrogen, taken care to insure that the temperature within the reactor did not exceed 10° C. at any time.

Reflux heating was then performed for 7 hours, and the alcohol was then distilled off.

Next, 2,000 cc. of ethyl ether and 6.5 mols of hydrochloric acid in the form of an aqueous solution of a strength of 50% by weight, was added to the reactive mass cooled to ambient temperature, and agitation was then carried out until the whole of the organic fraction had passed into solution and an etherified phase was formed. A filtering operation was carried out to eliminate the undissolved potassium chloride.

This etherified phase was isolated by decanting and then washed with distilled water to completely remove the chlorine ions and then excess of monochloroacetic acid. After the distillation of the ether, a product was collected having a weight of 1,050 g., with a light chestnut color, melting at approximately 90° C. and soluble in aromatic hydrocarbons, alcohols, ether, dioxane, chlorinated solvents such as carbon tetrachloride, chloroform. Its chlorine content was 52.8% (theoretical content 49.1) and its acid index was 195 (theoretical index 193).

EXAMPLE 2

Preparation of the diethyl ester of (biphenylene octachlorodioxy) diacetic acid 462 g. of octachlorodihydroxydiphenyl or 1 mol. thereof, 114.4 g. of potash in lozenges or 2.04 mols, thereof, and 1,200 cc. of ethanol were introduced in this order into a flask of 2,000 cc., equipped with a mechanical stirrer, a condenser, a dropping funnel and a nitrogen supply point.

Agitation was performed under nitrogen at normal temperature until a homogeneous mass was obtained, and 294 g. of ethyl monochloroacetate or 2.4 mols, thereof was then added thereto slowly.

Reflux heating was then performed for 7 hours, the alcohol and non-reacted ester then being distilled off. The reactive mass was treated with 1,000 cc. of ether and the potassium chloride formed during the reaction was eliminated by filtering.

The etherified phase was first washed with a 10% sodium hydroxide solution in order to eliminate, in the form of its alkaline salt, the non-reacted diphenol, and then with distilled water until neutralization and complete elimination of the chlorine ions. After distilling the ether, 510 g. was obtained of a light yellow product melting at approximately 35° to 40° C., soluble in aromatic hydrocarbons, alcohols, ether, dioxane, chlorinated solvents such as carbon tetrachloride, chloroform. The chlorine content amounted to 45.6% (theoretical content 44.8), its saponification index to 179 (theoretical index 177).

EXAMPLE 3

In a 750 cc. reactor equipped with a mechanical stirrer, a condenser, a dropping funnel and a nitrogen supply point successfully introduced were:

96.3 g. of nonachloromonohydroxydiphenyl, 0.2 mol,
28.5 g. of potash in lozenges, 0.51 mol,
280 cc. of ethanol.

Agitation was performed under nitrogen at normal temperature until a homogeneous mass was obtained.

This homogeneous mass was then cooled to close to 0° C., and 28.3 g. of monochloroacetic acid, 0.3 mol, in solution in 30 cc. of ethanol were added in the course of 2 hours under agitation and under nitrogen, taking care to insure that the temperature within the reactor did not exceed 10° C. at any time.

Reflux heating was then performed for 7 hours, and the alcohol was then distilled off.

Next, 200 cc. of ethyl ether and 0.3 mol of hydrochloric acid in the form of a 5 N aqueous solution were added to the reactive mass, cooled to ambient temperature, and agitation was then carried out until the whole of the organic fraction had passed into solution. A filtering operation was carried out to eliminate the undissolved potassium chloride.

The ether phase was isolated by decanting, then washed with distilled water to completely remove the chlorine ions. After the distillation of the ether, a product was collected, having a weight of 102 g., which after drying produced 97.3 g. of a white powder melting at about 210° C. and soluble in the chlorinated solvents such as chloroform, carbon tetrachloride as well as in aromatic hydrocarbons, alcohols, ether, dioxane. Its chlorine content was 61.4% (theoretical content 60.9%), and its acid index was 109 (theoretical index 104).

EXAMPLE 4

In the same reactor used for Example 3, there was introduced:

92.4 g. of nonachloromonohydroxydiphenyl, 0.2 mol,
11.9 g. of potash in lozenges, 0.204 mol,
240 cc. of ethanol.

Agitation was performed under nitrogen at normal temperature until a homogeneous mass was obtained, then 29.4 g., 0.24 mol of ethyl monochloroacetate were added thereto slowly.

Reflux heating was then performed for 7 hours, and the alcohol and the non-reacted ethyl monochloroacetate were distilled off. The reactive mass was treated with 1,000 cc. of ether, and the potassium chloride formed during the reaction was elimianted by filtering.

The ether phase was first washed when hot with a 5 N sodium hydroxide solution in order to eliminate non-reacted nonaphenol in the form of its alkaline salt, then with distilled water until neutralization and complete elimination of the chlorine ions. After distilling the ether, 510 g. of a light yellow product were obtained, soluble in aromatic hydrocarbons, alcohols, ether, dioxane, chlorinated solvents such as carbon tetrachloride and chloroform.

The chlorine content amounted to 54.3% (theoretical content 53.1), the saponification index to 92.5% (theoretical index 93.4).

While we have disclosed preferred embodiments of our invention, it may be otherwise embodied within the scope of the appended claim.

We claim:
1. A compound having the general formula:

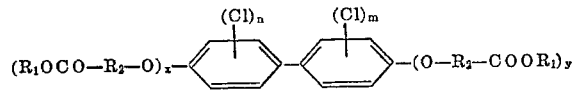

where $R_1$ is a member selected from the group consisting of an atom of hydrogen and an alkyl radical containing from 1 to 4 atoms of carbon, $R_2$ is alkylene of from 1 to 3 atoms of carbon, the amount $(x+y)$ is an integer number having values from 1, and in this case, either $x$ or $y$ is 0 to 2, the amount $(m+n)$ is an integer number having the value 9 or 8 and the amount $(x+y+m+n)$ always has the value 10.

References Cited

UNITED STATES PATENTS 3,112,338  11/1963  Smutny _____ 260—473
2,603,619   7/1952  Dazzi _____ 260—520

LORRAINE A. WEINBERGER, Primary Examiner.

JAMES NIELSEN, Assistant Examiner.

U.S. Cl. X.R.

260—45.85, 520, 435, 429

UNITED STATES PATENT OFFICE
CERTIFICATE OF CORRECTION

Patent No. 3,446,838                                              May 27, 1969

Laszlo Szobel et al.

It is certified that error appears in the above identified patent and that said Letters Patent are hereby corrected as shown below:

Column 1, line 41, "$-(O - R_2 - COOR_1)$" should read -- $-(O - R_2 - COOR_1)_y$ --.

Signed and sealed this 14th day of April 1970.

(SEAL)
Attest:

Edward M. Fletcher, Jr.                                 WILLIAM E. SCHUYLER, JR.
Attesting Officer                                                  Commissioner of Patents